US008265803B2

(12) United States Patent
He

(10) Patent No.: US 8,265,803 B2
(45) Date of Patent: Sep. 11, 2012

(54) SYSTEM AND METHOD FOR ENHANCING COMPUTER-GENERATED IMAGES OF TERRAIN ON AIRCRAFT DISPLAYS

(75) Inventor: Gang He, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/219,170

(22) Filed: Aug. 26, 2011

(65) Prior Publication Data

US 2011/0313658 A1   Dec. 22, 2011

Related U.S. Application Data

(62) Division of application No. 11/169,451, filed on Jun. 29, 2005, now Pat. No. 8,032,265.

(51) Int. Cl.
*G01C 230/00* (2006.01)
(52) U.S. Cl. .............................................. 701/3; 701/16
(58) Field of Classification Search .................. 701/3–6, 701/9–10, 13, 14, 15, 16
See application file for complete search history.

(56) References Cited

U.S. PATENT DOCUMENTS

| 4,952,922 A | 8/1990 | Griffin et al. |
| 5,929,860 A | 7/1999 | Hoppe |

(Continued)

FOREIGN PATENT DOCUMENTS

| WO | 9932850 | 7/1999 |

(Continued)

OTHER PUBLICATIONS

U.S. Office Action U.S. Appl. No. 11/169,451, dated Oct. 29, 2010.

(Continued)

*Primary Examiner* — Thomas Tarcza
*Assistant Examiner* — Imran Mustafa
(74) *Attorney, Agent, or Firm* — Ingrassia Fisher & Lorenz, P.C.

(57) ABSTRACT

A system and method are disclosed for enhancing the visibility and ensuring the correctness of terrain and navigation information on aircraft displays, such as, for example, continuous, three-dimensional perspective view aircraft displays conformal to the visual environment. More specifically, an aircraft display system is disclosed that includes a processing unit, a navigation system, a database for storing high resolution terrain data, a graphics display generator, and a visual display. One or more independent, higher precision databases with localized position data, such as navigation data or position data is onboard. Also, one or more onboard vision sensor systems associated with the navigation system provides real-time spatial position data for display, and one or more data links is available to receive precision spatial position data from ground-based stations. Essentially, before terrain and navigational objects (e.g., runways) are displayed, a real-time correction and augmentation of the terrain data is performed for those regions that are relevant and/or critical to flight operations, in order to ensure that the correct terrain data is displayed with the highest possible integrity. These corrections and augmentations performed are based upon higher precision, but localized onboard data, such as navigational object data, sensor data, or up-linked data from ground stations. Whenever discrepancies exist, terrain data having a lower integrity can be corrected in real-time using data from a source having higher integrity data. A predictive data loading approach is used, which substantially reduces computational workload and thus enables the processing unit to perform such augmentation and correction operations in real-time.

19 Claims, 6 Drawing Sheets

U.S. PATENT DOCUMENTS

| | | | |
|---|---|---|---|
| 6,002,347 A | 12/1999 | Daly et al. | |
| 6,043,757 A * | 3/2000 | Patrick | 340/963 |
| 6,216,065 B1 | 4/2001 | Hall et al. | |
| 6,678,588 B2 * | 1/2004 | He | 701/3 |
| 7,262,713 B1 * | 8/2007 | Vogl et al. | 340/970 |
| 2001/0055021 A1 | 12/2001 | Freeman | |
| 2002/0036573 A1 | 3/2002 | Wyatt | |
| 2003/0059743 A1 | 3/2003 | Lechner | |
| 2005/0007386 A1 | 1/2005 | Berson et al. | |
| 2005/0099433 A1 * | 5/2005 | Berson et al. | 345/619 |

FOREIGN PATENT DOCUMENTS

| | | |
|---|---|---|
| WO | 0111383 | 2/2001 |

OTHER PUBLICATIONS

U.S. Office Action U.S. Appl. No. 11/169,451, dated Mar. 2, 2010.
U.S. Office Action U.S. Appl. No. 11/169,451, dated Oct. 29, 2009.
U.S. Office Action U.S. Appl. No. 11/169,451, dated Nov. 26, 2009.
U.S. Office Action U.S. Appl. No. 11/169,451, dated Jun. 19, 2008.
Prinzel et al., "NASA Synthetic Vision EGE Flight Test," 1999, pp. 1-5, NASA Langley Research Center, Hampton VA USA.
PCT/US2006/025761, Notification of Transmittal of Int'l Search Report and Written Opinion of the Int'l Searching Authority or Declaration dated Jul. 11, 2006.

* cited by examiner

SYSTEM AND METHOD FOR ENHANCING COMPUTER-GENERATED IMAGES OF TERRAIN ON AIRCRAFT DISPLAYS

CROSS-REFERENCE TO RELATED APPLICATION

This is a division of U.S. patent application Ser. No. 11/169,451, filed Jun. 29, 2005.

FIELD OF THE INVENTION

The present invention relates generally to the field of display systems, and more specifically, but not exclusively, to a system and method for enhancing computer-generated images of terrain on aircraft displays.

BACKGROUND OF THE INVENTION

Modern aircraft contain visual display systems that provide flight crews with substantial amounts of important operational and situational awareness information about the environment outside the aircraft, such as terrain. In fact, multi-functional aircraft displays that provide flight crews with computer-enhanced, three-dimensional perspective images of terrain (e.g., especially during conditions of low visibility) are known. One approach used to enhance terrain imagery in existing multi-functional aircraft displays is to combine high resolution, computer-generated terrain image data derived from onboard databases (e.g., synthetic vision systems) with enhanced, real-time terrain image data derived from onboard vision sensor systems (e.g., Forward Looking Infrared/FLIR sensors, active and passive radar devices, etc.). However, a major drawback of this approach is that significant data integrity issues exist with the computer-generated terrain information derived from the onboard databases, and significant non-intuitive imaging issues exist with the real-time terrain information derived from the vision sensor systems. Also, similar issues may arise in other applications. For example, data integrity and imaging issues can arise with the use of synthetic vision displays for Unmanned Aerial Vehicle (UAV) operations, and high-fidelity flight training simulators using flight worthy data sources where certain targets or objects are mapped with higher accuracy than the underlying terrain. As a result of these problems, visual display disparities and operator errors can occur.

For example, in today's aircraft displays, high resolution terrain data has to be provided on a continuous basis to an onboard graphics display processor, in order for the processor to produce steady, three-dimensional perspective view images of the terrain for critical flight applications. However, since terrain data for aircraft applications typically covers the entire globe on a continuous basis, such an onboard database would contain an enormous amount of terrain data. Thus, it would be an almost impossible task to physically verify all of the data points in such a database for critical flight applications. As such, other techniques are required to correct and augment this data, and especially during the operational phases where the terrain information is important for flight applications, such as during take-offs and landings or near terrain-challenged areas. Additionally, the techniques used for data correction and augmentation need to lead to information presented to flight crews in correct and natural formats so as not to introduce additional confusion factors during the critical phases of flight operations. Generally, real-time data correction and augmentation techniques need to be performed in those applications where the terrain information displayed has more impact for flight operations, and where other data from more accurate sources (e.g., localized databases, real-time sensors, uplinks from ground-based databases, etc.) are available.

Another significant problem with the use of high resolution terrain data for these perspective view display applications is that they place a heavy load on the processor involved, and therefore, certain data computation techniques (e.g., simple-or continuous-level of detail computation techniques) have to be used in order to reduce the computational workload. Additionally, the terrain data is also decompressed and dynamically displayed. Consequently, using the existing data computation techniques, whenever a large patch of terrain data is loaded for pre-processing during the initialization phase (e.g., immediately after the terrain display application is turned on), the processing system experiences a significant latency period and a corresponding delay before that data can be displayed. Similarly, using existing data computation techniques, if the processing system attempts to load such terrain data in real-time, then significant discontinuities and instabilities can occur with the display of the data derived from regions close to the borders of previously loaded data. As such, these data integrity and processing problems impose significant data storage and processing limitations on existing onboard aircraft display systems, which significantly limit the usefulness of displays for flight critical applications. Since it is impractical to completely verify all of the data stored in the database, a viable data computation technique is needed that will enable a processor to produce steady, perspective view images of terrain information for critical flight applications, whereby the terrain information is derived from the fusion of high resolution terrain data retrieved from a database, with real-time data received from one or more vision sensor systems, an onboard database having higher data precision in localized areas, one or more radar sensors, or precision data uplink from one or more ground stations. In any event, an example of the above-described data computation problem is illustrated by FIG. 1, which depicts an existing computer-generated aircraft display.

Referring to FIG. 1, display 100 represents a conventional onboard electronic display, such as, for example, a Primary Flight Display (PFD) and/or a Heads-Down Display (HDD). Display 100 shows, among other things, computer-generated symbols representing a zero pitch reference line 102, a flight path marker (also known as a flight path vector, or velocity vector) 104, an airspeed scale or tape 106, an altitude scale or tape 108, and natural terrain (e.g., identified generally as element 110). Essentially, as an aircraft approaches an airport (e.g., man-made terrain feature) for landing, the pilot locates an intended runway (e.g., also man-made terrain feature), and aims the aircraft in the direction of the runway. The pilot aims the aircraft at the runway by controlling the aircraft's movement, which typically results in the runway remaining in the close vicinity of the flight path marker symbol 104. However, as illustrated by the example shown in FIG. 1, a runway symbol is not being displayed, although it may be assumed that the arrow 112 identifies the known location of a runway relative to this view. In this case, the elevation of the terrain data that produces the computer-generated three-dimensional image (e.g., of natural terrain 110) is slightly higher than the elevation of the runway data (e.g., for the man-made terrain/runway at location 112). Thus, due to the aforementioned problems with the existing data computation techniques used, the symbol for the runway known to be at location 112 is obscured on conventional display 100. As such, this loss of visual contact of such critical runway/terrain information by a pilot (e.g., especially in the vicinity of that airport)

decreases the effectiveness, accuracy and safety of the flight decisions being made, and thus increases the possibility that dangerous flight management, navigation or control errors can occur. Therefore, it would be advantageous to have a system and method that enhances computer-generated terrain images on an electronic display, such as, for example, a PFD, HDD, or similar electronic aircraft display. As described in detail below, the present invention provides such a system and method, which resolves the terrain data integrity problems, data computation problems, and terrain visibility problems encountered with existing electronic aircraft displays.

SUMMARY OF THE INVENTION

The present invention provides an improved system and method for enhancing the visibility of terrain and navigation information on aircraft displays, such as, for example, continuous, three-dimensional perspective view aircraft displays conformal to the visual environment. In accordance with a preferred embodiment of the present invention, an aircraft display system is provided that includes a processing unit, a navigation system, a database for storing high resolution terrain data, a graphics display generator, and a visual display. One or more independent, higher precision databases with localized position data, such as navigation data or position data is onboard. One or more onboard vision sensor systems associated with the navigation system provide real-time spatial position data for display. One or more data links is available to receive precision spatial position data from ground-based stations. The processing unit directs the graphics display generator to generate graphic control signals for the visual display, which enhance the visibility of the terrain and navigational information shown on the continuous, three-dimensional perspective view display. Essentially, before terrain and navigational objects (e.g., runways) are displayed, a real-time correction and augmentation of the terrain data is performed for those regions that are relevant and/or critical to flight operations, in order to ensure that the correct terrain data is displayed with the highest possible integrity. These corrections and augmentations performed are based upon higher precision, but localized onboard data, such as navigational object data, sensor data, or up-linked data from ground stations. Whenever discrepancies exist, terrain data having a lower integrity can be corrected in real-time using data from a source having higher integrity data. A predictive data loading approach is used to allow such real-time operations, whereby the processing unit determines an aircraft's current position, heading and speed, and initially loads a patch of terrain data for a region that is suitably sized to provide a rapid initialization of the data, data corrections, and for a reasonable amount of flight time. The processing unit then monitors the aircraft's position, heading and speed, and continuously predicts the potential boundaries of a three-dimensional region or volume of terrain in the flight path based on the aircraft's position, heading and speed. The processing unit compares the predicted boundaries with the boundaries of the initially loaded terrain data, and if the distance from the aircraft to a predicted boundary is determined to be less than a predetermined value (e.g., associated with the boundaries of the initially loaded data), then the processing unit loads a new patch of terrain data that is optimally sized given the aircraft's current position, heading and speed. In order to minimize the duration of the pre-processing operation prior to loading the new patch of terrain data, the processing unit compiles the new patch of terrain data partially with old data derived from the previously loaded patch and also new data retrieved from the database.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 2:
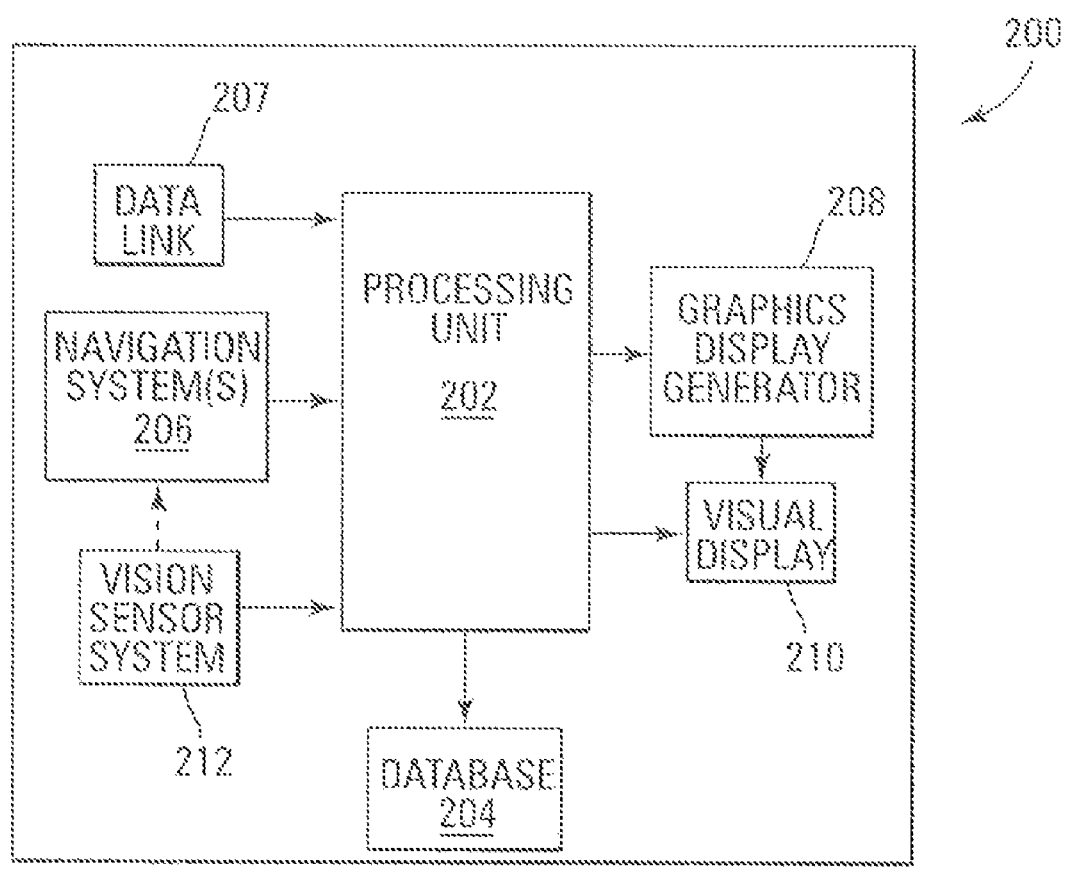
FIG. 2 depicts a block diagram of an example system for ensuring the correctness of terrain information on an aircraft display, which can be used to implement a preferred embodiment of the present invention.

With reference again to the figures, FIG. 2 depicts a block diagram of an example system 200 for ensuring the correctness of terrain information on an aircraft display (e.g., continuous, three-dimensional perspective view display), which can be used to implement a preferred embodiment of the present invention. For this example, system 200 includes a processing unit 202, a database 204, a navigation system 206, a high speed data link 207, a graphics display generator 208, a visual display 210, and one or more vision sensor systems 212. Notably, it should be understood that although system 200 appears in FIG. 2 to be arranged as an integrated system, the present invention is not intended to be so limited and can also include an arrangement whereby one or more of processing unit 202, database 204, navigation system 206, data link 207, graphics display generator 208, visual display 210 and one or more vision sensor systems 212 is a separate component or a subcomponent of another system located either onboard or external to an aircraft. Also, for example, system 200 can be arranged as an integrated system (e.g., aircraft display system, PFD system, etc.) or a subsystem of a more comprehensive aircraft system (e.g., Flight Management System, navigation and control system, target aiming and control system, collision alert and/or avoidance system, weather avoidance system, etc.).

For this embodiment, processing unit 202 can be a computer processor such as, for example, a microprocessor, digital signal processor, or any suitable processor capable of at least receiving and/or retrieving aircraft status information, real-time terrain information and navigation and control information (e.g., from navigation system 206 and/or one or more vision sensor systems 212), and high resolution terrain information (e.g., from database 204), and also generating suitable display control signals for a visual display of the aircraft status information, the navigation and control information (including, for example, a zero pitch reference line, heading indicators, tapes for airspeed and altitude, flight path marker or similar type of aircraft aiming symbol, etc.), the high resolution terrain information, and the real-time terrain information, and sending the generated display control signals to a graphics display generator (e.g., graphics display generator 208) associated with a visual display (e.g., visual display 210).

For example, processing unit 202 can be arranged as a single processor or plurality of processors connected to a data communications bus or system bus. A memory controller/cache can also be connected to the data communications bus or system bus, which can provide an interface between processing unit 202 and a local memory (e.g., RAM, ROM, etc.). Preferably, but not necessarily, a high-speed data communications bus or system bus is used. A plurality of machine instructions can be stored in the local memory and retrieved and operated on by processing unit 202 to generate the control signals for the graphics display generator 208 and visual display 210. An Input/Output (I/O) bus bridge can also be connected to the data communications bus or system bus, which can provide an interface between processing unit 202 and an I/O bus. Thus, processing unit 202 can receive, retrieve and/or send data via such an I/O bus. In any event, those of ordinary skill in the art will appreciate that the hardware described herein for processing unit 202 in FIG. 2 may vary. As such, the depicted example is provided for illustrative purposes and not meant to imply any architectural limitations with respect to the present invention.

For this example embodiment, system 200 also includes database 204 coupled to processing unit 202 (e.g., via an I/O bus connection). For example, database 204 can be a memory device (e.g., non-volatile memory, disk, drive, tape, optical storage device, mass storage device, etc.) that can store digital terrain data (e.g., latitudinal and longitudinal data) as either absolute coordinate data or as a function of an aircraft's position. A source for the digital terrain data stored in database 204 can be, for example, a United States Geological Survey (USGS) map having a suitable resolution (e.g., approximately 90 meters), which includes topographical relief information that can be used to apply grid lines following the contour of terrain. Also, database 204 can store a target location database that includes data defining the known geographical boundaries of numerous airports and runways (e.g., static, man-made terrain data).

Database 204 can also include, for example, a suitable terrain database, which can include the locations and elevations of natural terrain obstacles such as mountains or other elevated ground areas, and also the locations and elevations of man-made obstacles such as radio antenna towers, buildings, bridges, etc. Such a terrain database can also include, for example, the boundaries of restricted airspace, restricted elevations for particular airspace, bodies of water, etc. As yet another example, a terrain database stored in database 204 can be a Jeppesen-styled database, which can cover, for example, a 300 by 270 mile area of terrain and include topographical relief information. Database 204 can also include a separate navigation database for localized targets, such as, for example, runways, navigational waypoints, and position beacons (e.g., very high accuracy data due to the improved mapping and surveying techniques employed during their long-term and continuous use).

Notably, for this example embodiment, real-time airport and runway location data and similar types of terrain data (e.g., spatial position data) are also received (e.g., by processing unit 202) from an onboard device 212 (e.g., vision sensor system that may or may not be associated with navigation system 206) that senses and maps man-made obstacles (e.g., airports, runways, etc.) and variations in natural terrain, such as, for example, a FLIR sensor, or an active or passive type of radar device. Also, in addition to the airport and runway location data, other types of high priority data (e.g., locations of incoming traffic to avoid, constructed waypoints, obstacles in the aircraft's flight path, etc.) can be retrieved and/or received by processing unit 202 from a suitable source of such data, such as, for example, an onboard navigation database (e.g., a component of navigation system 206), an onboard FLIR sensor or radar device (e.g., a vision sensor system 212), or an external database via a data communication up-link (e.g., data link 207). As such, this high priority data can include high precision spatial position data.

For this embodiment, system 200 also includes navigation system 206 coupled to processing unit 202 (e.g., via a respective I/O bus connection). Navigation system 206 can provide navigation data associated with the aircraft's current status, position and flight direction (e.g., heading, course, track, attitude, etc.) to processing unit 202. As such, navigation system 206 can include, for example, an inertial navigation system, a satellite navigation system (e.g., Global Positioning System) receiver, VLF/OMEGA, Loran C, VOR/DME, DME/DME, IRS, aircraft attitude sensors, or the navigation information can come from an onboard Flight Management System (not shown). The navigation data provided to processing unit 202 can also include information about the aircraft's airspeed, altitude (e.g., relative to sea level), attitude, pitch, and other important flight information if such information is desired. In any event, for this example embodiment, navigation system 206 can include any suitable position and direction determination devices that are capable of providing processing unit 202 with at least an aircraft's current position (e.g., in latitudinal and longitudinal form), the real-time direction (e.g., heading, course, track, etc.) of the aircraft in its flight path, and other important flight information (e.g., pitch, airspeed, altitude, attitude, etc.).

For this embodiment, system 200 also includes graphics display generator 208 coupled to processing unit 202 (e.g., via an I/O bus connection) and visual display 210. Visual display 210 can also be coupled to processing unit 202 (e.g., via an I/O bus connection). For example, visual display 210 may include any device or apparatus suitable for displaying various types of computer-generated symbols and information representing at least natural and man-made terrain, pitch, heading, flight path, airspeed, altitude, attitude, target data, and flight path marker data in an integrated, multi-color or monochrome form (e.g., flat-panel color display). Using an aircraft's current position, speed and direction (e.g., heading, course, track, etc.) data retrieved (or received) from navigation system 206, real-time terrain data retrieved (or received) from one or more vision sensor devices 212 (e.g., that may or may not be associated with navigation system 206), and natural and man-made terrain data retrieved from database 204, processing unit 202 executes one or more algorithms (e.g., implemented in software) for controlling the loading and pre-processing of terrain data for display using a predictive data loading approach (primarily to minimize computation workload) based on the aircraft's current position, heading and speed. Processing unit 202 then generates a plurality of display control signals representing, among other things, the high resolution and real-time terrain data received and/or retrieved, respectively, from database 204 and the vision sensor device(s) (e.g., vision sensor system 212) associated with navigation system 206, and sends the plurality of display control signals to visual display 210 via graphics display generator 208. Preferably, for this embodiment, visual display 210 is an aircraft cockpit, multi-color flat-panel display (e.g., a Primary Flight Display). Graphics display generator 208 interprets the received plurality of display control signals and generates suitable symbols representing the high resolution and real-time terrain data, along with suitable symbols for the flight path marker, zero pitch reference line, heading indicator(s), airspeed tape, altitude tape, and targets, which are presented on a screen or monitor of visual display 210.

Notably, although a conventional cockpit display screen may be used to display the above-described flight information and terrain symbols and data, the present invention is not intended to be so limited and can include any suitable type of display medium capable of visually presenting multi-colored or monochrome flight information and terrain symbols and data for a pilot or other flight crew member, and in particular, but not exclusively, on a continuous, three-dimensional perspective view aircraft display. As such, many known display monitors are suitable for displaying such information, symbols and data, such as, for example, various CRT and flat-panel display systems (e.g., CRT displays, LCDs, OLED displays, plasma displays, projection displays, HDDs, Heads-Up Displays/HUDs, etc.). For example, visual display 210 can be implemented as a heads-down Primary Flight Display by a DU-1080 Display Unit or DU-1310 Display Unit, which are color active matrix LCD-based devices produced by Honeywell International, Inc. of Morristown, N.J. Also, an example HUD that can be used for visual display 210 is the HUD2020 device also produced by Honeywell International, Inc.

For this example embodiment, graphics display generator 208 can be configured to generate symbols representing terrain data, target data, aircraft status information, navigational information, and other flight information to a screen or monitor of visual display 210 (e.g., responsive to operations of processing unit 202). For this embodiment, graphics display generator 208 (e.g., responsive to operations of processing unit 202) may render a multi-colored or monochrome image of natural and man-made terrain, a flight path marker symbol, zero pitch reference line symbol, heading indicator symbols, airspeed and altitude tape symbols, and target symbols on a screen of visual display 210. Graphics display generator 208 (e.g., responsive to operations of processing unit 202) may also render multi-colored or monochromatic images of weather data on the screen of visual display 210.

Notably, in accordance with the principles of the present invention, the visibility of the terrain information displayed on the screen of visual display 210 may be enhanced responsive to one or more suitable algorithms (e.g., implemented in software) executed by processing unit 202, which functions to determine an aircraft's current position, heading and speed, and initially loads a patch of terrain data for a region that is suitably sized to provide a rapid initialization of the data, the data correction, and also sized for a reasonable amount of flight time. Processing unit 202 monitors the aircraft's position, heading, and speed (e.g., also attitude when pertinent), and continuously predicts the potential boundaries of a three-dimensional region (volume) of terrain in the flight path based on the aircraft's then-current position, heading and speed (e.g., and attitude when pertinent). Processing unit 202 compares the predicted boundaries with the boundaries of the initially loaded terrain data, and if the distance from the aircraft to a predicted boundary is determined to be less than a predetermined value (e.g., distance value associated with the boundaries of the initially loaded data), then processing unit 202 initiates an operation to load a new patch of terrain data that is optimally sized given the aircraft's current position, heading and speed (e.g., and attitude when pertinent). Also, processing unit 202 can further enhance the visibility of the terrain information being displayed, by substituting real-time (and, for example, higher accuracy) terrain information (e.g., spatial position information) derived from the one or more onboard vision sensors (e.g., vision sensor system 212) for pertinent portions of the new data retrieved from database 204. Notably, for this example embodiment, processing unit 202 can execute the data loading operations separately from the operations that determine the aircraft's current position, heading and speed, in order to maintain a constant refresh rate and not interfere with the continuity of the current display of terrain. As such, FIG. 3 depicts a pictorial representation of a visual display, which illustrates the present invention's terrain data correction and augmentation approach for producing enhanced and visually correct three-dimensional perspective view displays.

Figure 3:
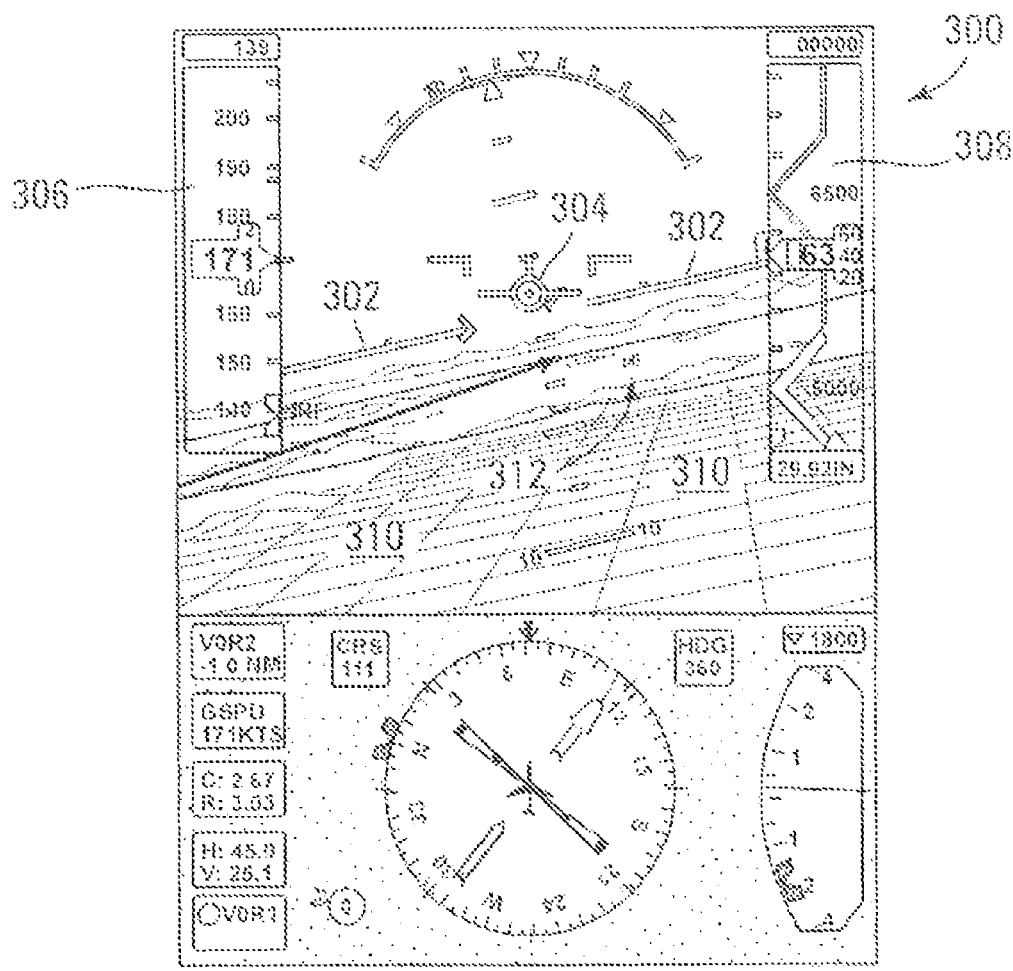
FIG. 3 depicts a pictorial representation of a visual display, which illustrates the present invention's terrain data correction and augmentation approach for producing enhanced and visually correct three-dimensional perspective view displays.

Referring to FIG. 3, a pictorial representation of a visual display 300 (e.g., presentation for visual display 210 in FIG. 2) is shown, which includes a visual representation of an onboard aircraft display that illustrates a preferred embodiment of the present invention. For this example embodiment, visual display 300 is preferably a heads-down Primary Flight Display. However, the present invention is not intended to be so limited and can also be implemented with any suitable type of electronic aircraft display (e.g., HUD) that can display, for example, continuous, three-dimensional perspective views of terrain information and other important flight information (e.g., pitch, heading, course, track, airspeed, altitude, targets, aiming symbols, etc.). Essentially, an airport symbol can be displayed when an aircraft is higher than 1,000 feet above ground level (AGL) or positioned at a significant distance from the airport involved, because the relative size of the airport makes it visible from that altitude or distance. However, as the aircraft approaches the airport, a runway symbol should appear, and the airport symbol is typically removed from the display.

Figure 1:
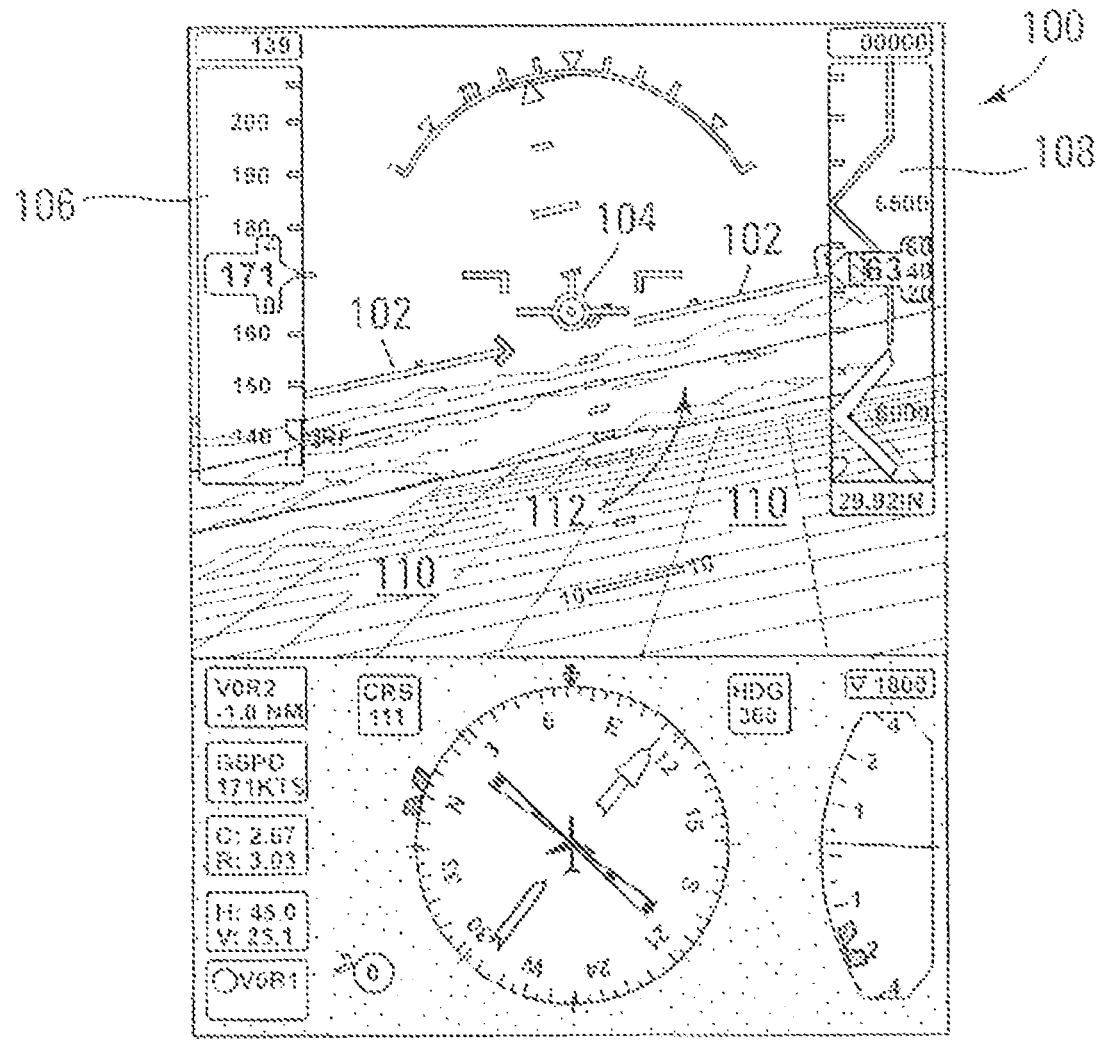
FIG. 1 depicts an existing computer-generated aircraft display.

At this point it is important to note that, in accordance with the predictive data loading and terrain visibility enhancement principles of the present invention, the view shown in visual display 300 differs significantly from the view in prior art aircraft displays (e.g., visual display 100 in FIG. 1), in that the airport runway information (e.g., runway symbol 312) can now be seen in the view of visual display 300. This same runway information was obscured in the view of the prior art display (e.g., visual display 100). Thus, for this example embodiment, when the aircraft is at a particular distance from the airport (e.g., at a much greater distance than that available using a conventional three-dimensional, perspective view display), the pilot can begin controlling the aircraft so as to aim the aircraft at a selected portion of the runway 312, which results in the flight path marker (flight path vector, velocity vector, aiming symbol, etc.) 304 remaining near the selected portion of the runway 312. As such, for this example, display 300 also provides, among other things, a visual representation of important flight, navigation and control information, such as a zero pitch reference line 302, an airspeed tape (or scale) 306, an altitude tape (or scale) 308, and natural terrain (e.g., identified generally as element 310). Therefore, as illustrated by the view shown in FIG. 3, the present invention's predictive approach for loading relatively large amounts of terrain data for a continuous, three-dimensional perspective view display, enhances the ability of the pilot to view (and also aim the aircraft at) runway 312, which reduces pilot workload and navigation and control errors, and also results in increased flight safety.

Figure 4:
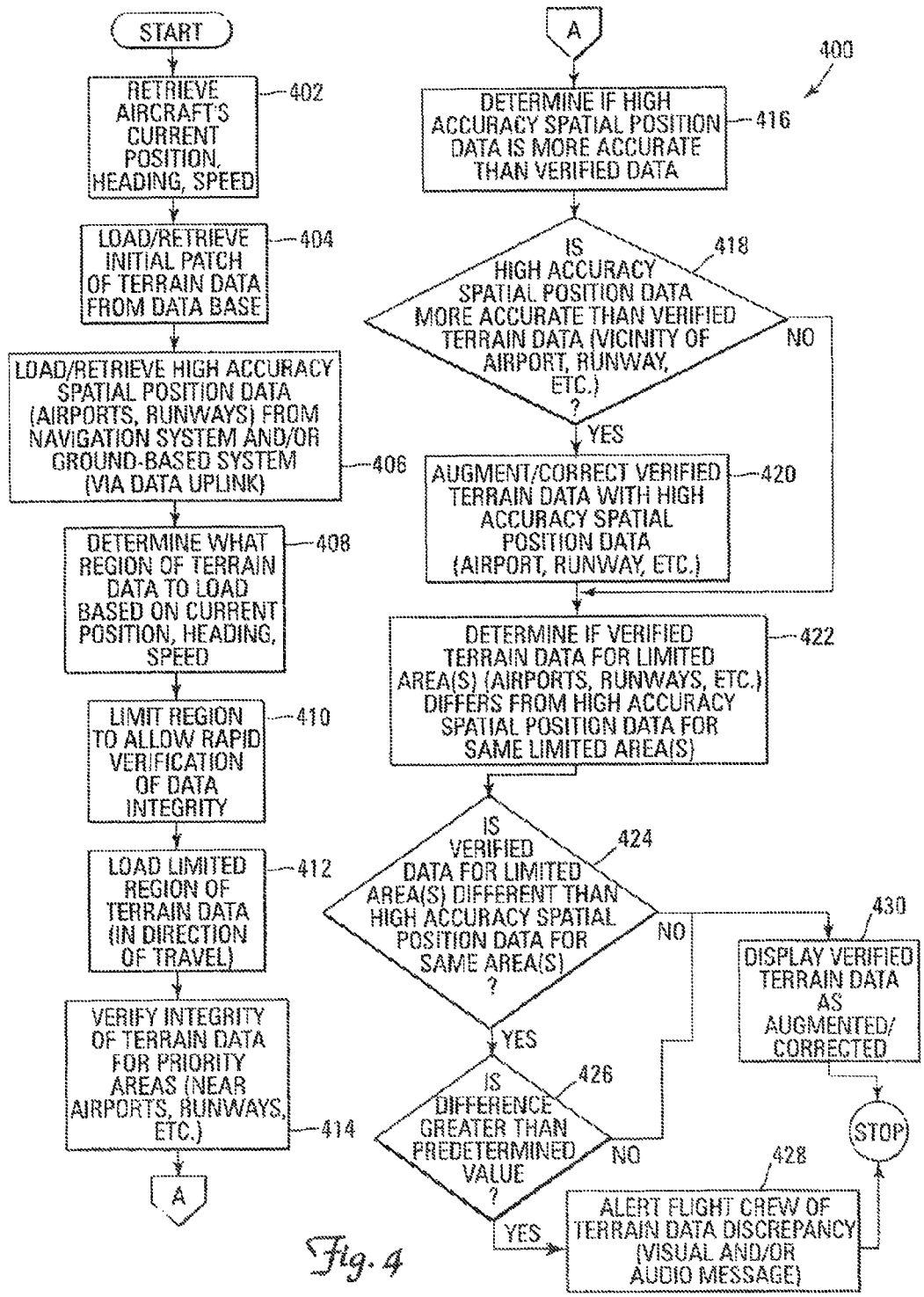
FIG. 4 depicts a flow chart showing an exemplary method for performing limited patch terrain data loading and correction based on high accuracy spatial position data to enhance the visibility and ensure the correctness of terrain information on an electronic display, in accordance with a preferred embodiment of the present invention.

FIG. 4 depicts a flow chart showing an exemplary method 400 for performing limited patch terrain data loading and correction based on high accuracy spatial position data to enhance the visibility and ensure the correctness of terrain information on an electronic display, in accordance with a preferred embodiment of the present invention. Referring to FIGS. 2-4, for this example, processing unit 202 retrieves (or receives) current flight status information (e.g., current position, heading or track, speed) for an aircraft involved (step 402). For this example, the aircraft's current flight status information can be provided by navigation system 206. Processing unit 202 then retrieves (e.g., from database 204) and loads an initial patch of terrain data, based on the aircraft's current position, heading and speed (step 404). The direction and size of the initial patch can also be based, for example, on pertinent information derived from the aircraft's flight plan (e.g., intended flight path, etc.). An illustrative example of such a patch of terrain data for loading is shown in FIG. 5.

Figure 5:
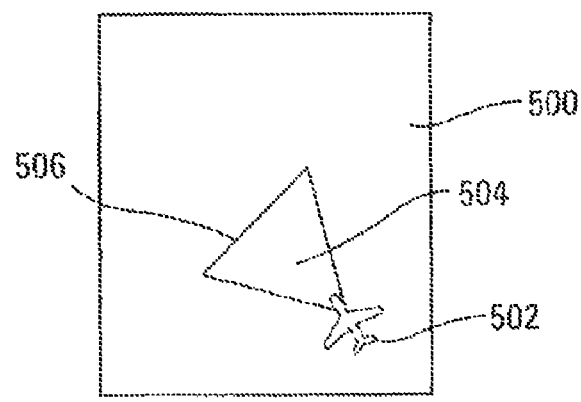
FIG. 5 depicts an illustrative example of a method for selecting a patch of terrain data for loading, in accordance with a preferred embodiment of the present invention.

Referring to FIG. 5, for this example embodiment, the region 500 can represent all (or a substantial portion of) the terrain information stored in an onboard database (e.g., database 204) for an aircraft involved (e.g., represented by element 502) with respect to the aircraft's current position. In this example, a patch of terrain data for loading is represented by the rectangular region (e.g., region 500) enclosing the triangular-shaped region, which is the terrain area currently being viewed by a flight crew (e.g., represented by element 504) in FIG. 5. Notably, patch 504 of terrain data is formed of terrain information that is directly in the flight path of aircraft 502. However, also note that although patch 504 is shown as a two-dimensional region in FIG. 5, it should be understood that this rendering is for illustrative purposes only, and for this embodiment, patch 504 represents a three-dimensional region with a volume defined in two dimensions by the legs of the triangle and the enclosing rectangle, and with the third dimension (perpendicular to the two-dimensional plane defined by the triangle) defined by the positive and negative elevations. As such, for a second embodiment of the present invention, a patch of terrain data for loading can include, for example, some or all of region 500. In other words, the present invention is not intended to be limited to a particular position, size or orientation for the patch of terrain data involved. However, for example, the position of the patch selected for loading can be predetermined so as to offer a reasonable flight time for augmentation or correction of the terrain data to be shown in the background, and the size of the patch selected for loading can depend on one or more of a number of pertinent parameters, such as the distance or range to the outermost edge of the view to be displayed in the direction of the flight path, the resolution of the terrain data involved, and the processing speed required to augment, and/or verify the integrity of, the terrain data selected for loading.

Returning to FIG. 4, for this example embodiment, processing unit 202 then retrieves and loads high accuracy terrain data (e.g., for airports, runways, etc.) for a region that corresponds to patch 504 (step 406). For example, the high accuracy terrain data (e.g., spatial position data) can be retrieved (or received) from navigation system 206 (e.g., with data generated by one or more vision sensor systems 212), directly from one or more vision sensor systems 212, and/or from a pertinent ground-based navigation system (e.g., via a data uplink connection 207). Next, for this example, processing unit 202 determines or selects a second or new patch of terrain data to load (e.g., from database 204), based on the aircraft's current position, heading and speed (step 408).

Next, in order to reduce computational workload, processing unit 202 limits the selected region of terrain data to a predetermined amount of data that will allow the computational process required to verify the integrity of the terrain data involved to be completed relatively quickly (step 410). Processing unit 202 then retrieves and loads the limited region of terrain data which is located directly in the flight path of the aircraft involved (step 412).

Next, in accordance with principles of the present invention, processing unit 202 executes one or more suitable algorithms (e.g., implemented in software) to verify the integrity of the retrieved terrain data (the limited region) for one or more priority areas, such as, for example, for any region near to and including an airport, runway, etc. within the limited region (step 414). Processing unit 202 then compares the accuracy of the verified terrain data for the limited regions (e.g., near airports, runways, etc.) with the accuracy of the high accuracy terrain data (e.g., precision spatial position data) retrieved earlier for the same regions (step 416). If processing unit 202 determines that the high accuracy terrain data (e.g., precision spatial position data) for a priority region (e.g., airport, runway, etc.) is more accurate than the verified terrain data for that same priority region (step 418), then processing unit 202 augments or corrects the verified terrain data (e.g., from database 204) for that priority region with the high accuracy data (e.g., spatial position data from navigation system 206 and/or one or more vision sensors 212) for that same region (step 420). Thus, in accordance with the present invention, the more accurate terrain information for the priority areas (e.g., airports, runways, etc.) derived from the available sources of terrain data (e.g., the high resolution data in the terrain database, or the high accuracy, spatial position data from the navigation system, one or more vision sensors, data uplink, etc.) is now available for display, along with the high resolution terrain data for the remaining region outside the priority regions.

However, if (at step 418) processing unit 202 determines that the high accuracy terrain data for a priority region is not more accurate than the verified terrain data for that same priority region, then processing unit 202 determines if the verified terrain data (e.g., derived from the database) for that priority region is significantly different than the high accuracy terrain data (e.g., derived from one or more vision sensor systems 212, data uplink 207, and/or navigation system 206) for that same region (step 422). If processing unit 202 determines that the verified terrain data is significantly different than the high accuracy terrain data for a particular priority region (step 424), then processing unit 202 determines if the difference between the verified data and high accuracy data is greater than a predetermined value (step 426). If so, processing unit 202 can assume there is a significant discrepancy with that terrain data, and processing unit 202 can initiate a suitable algorithm to alert the flight crew (e.g., by display of a visual alert message and/or issuance of an audio alert message) of the terrain data discrepancy for the priority region(s) involved (step 428). The flight crew can then navigate without using that data on the display. However, if (at step 424), processing unit 202 determines that the verified terrain data and high accuracy terrain data for the same priority region(s) is/are not significantly different, then processing unit 202 forwards the verified terrain data (e.g., as augmented and/or corrected with the high accuracy terrain data, spatial position data, precision spatial position data) to visual display 210 via graphics display generator 208 (step 430).

Figure 6:
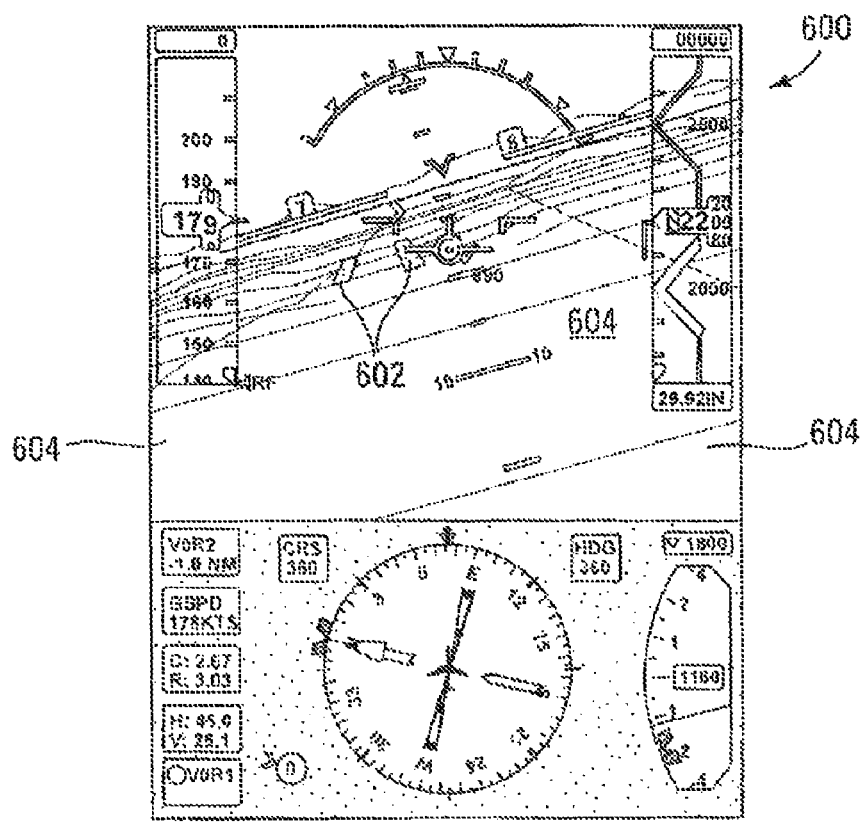
FIG. 6 depicts an example of an enhanced display of runway data on an electronic aircraft display, in accordance with a preferred embodiment of the present invention.
Figure 7:
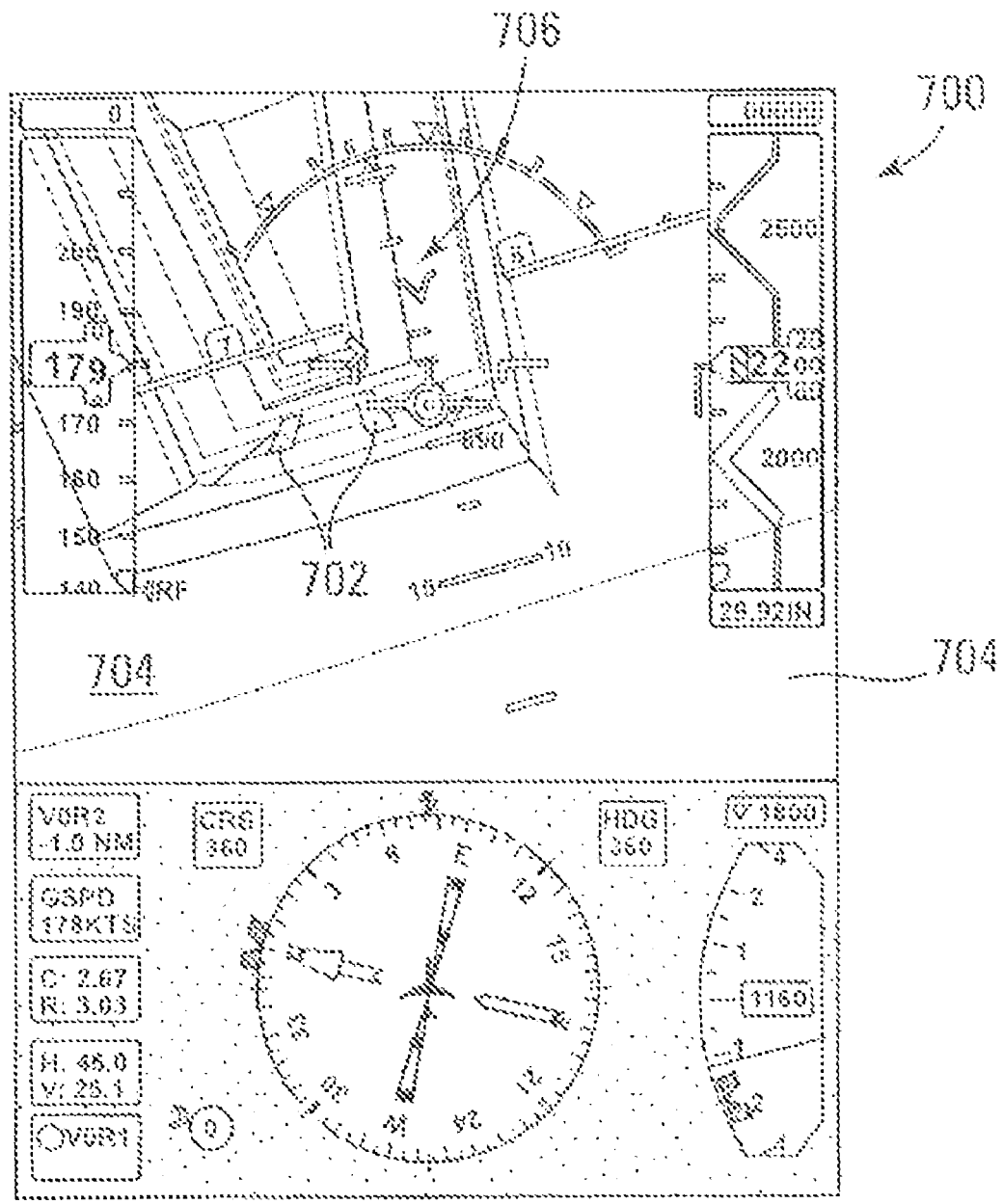
FIG. 7 depicts an illustrative example of an enhanced display of terrain data and augmentation with high accuracy spatial position data where there is a discrepancy in the data involved.

In accordance with a preferred embodiment of the present invention, an example of an enhanced display of runway data on an electronic aircraft display is shown in FIG. 6. As shown for this example embodiment, visual display 600 includes terrain data for two runways 602 and other (natural) terrain data 604. The runways (602) are enhanced by substituting high accuracy terrain data (e.g., spatial position data) for the runways for the high resolution terrain data (e.g., terrain data 604). Alternatively, in accordance with the present invention, FIG. 7 illustrates an example of terrain data augmentation with high accuracy data where there is a discrepancy in the data involved. In this case, the runway data (702) on visual display 700 has been enhanced with respect to the other terrain data (704), but inaccuracies with the integrity of the high resolution airport data (706) have also been enhanced. As such, for this example, the flight crew can visualize the problem with this data discrepancy in visual display 700 and take corrective action. However, the present invention also provides a visual and/or audio alert to notify the flight crew of such a data discrepancy.

Therefore, in accordance with the present invention, a system and method are provided for enhancing the visibility and ensuring the correctness of terrain information on an electronics aircraft display, in which high resolution terrain data for limited priority regions can be augmented and/or corrected with high accuracy terrain data (e.g., spatial position data, precision spatial position data, etc.) for the same priority regions, and the flight crew can be alerted to any discrepancy found between the high resolution terrain data and high accuracy spatial position data. For example, if the elevation of terrain data stored in an onboard database for a particular airport is slightly higher than the elevation of the terrain data for that airport derived from a navigation system, then that airport information can be obscured on a conventional display. However, the present invention can augment and/or correct the terrain data from the database with the more accurate spatial position data from the navigation system, which enhances the visibility and ensures the correctness of the terrain data for priority regions (e.g., near airports, runways, etc.) on the display. Nevertheless, if the terrain data about a known accurate data point is incorrect, then that incorrect data can be amplified by the augmentation/correction process. Therefore, in accordance with the present invention, if the value of the augmentation or correction of the terrain data is significantly greater than a predetermined or threshold value, then a visual and/or audio alert message regarding such a terrain data discrepancy can be issued for the flight crew. The flight crew can then decide whether or not to continue the approach based on direct visual navigation information derived from another source (e.g., onboard sensor, Flight Management System, navigation system, GPS receiver, etc.).

It is important to note that while the present invention has been described in the context of a fully functioning visual display system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular visual display system.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A system for enhancing the visibility and ensuring the correctness of terrain information on a visual display onboard an aircraft, comprising:
   a database having a set of terrain data stored therein;
   a position data source to produce a set of spatial position data; and
   a processing unit coupled to the database and the position data source to:
      receive at least one of a current position, heading and speed of the aircraft;
      load a patch of terrain data, the patch of terrain data corresponding to a first region, the first region being based on at least one of the current position, heading and speed of the aircraft, and the patch of terrain data comprising a subset of the set of terrain data;
      identify a priority region within the first region;
      retrieve a subset of the set of spatial position data corresponding to the priority region from the position data source;
      compare an accuracy value for a subset of the patch of terrain data corresponding to the priority region with an accuracy value for the subset of the set of spatial position data corresponding to the priority region; and
      augment the subset of the patch of terrain data corresponding to the priority region with the subset of the set of spatial position data corresponding to the priority region when the subset of the set of spatial position data is more accurate than the patch of terrain data.

2. The system of claim 1, wherein the processing unit is operable to augment the subset of the patch of terrain data by substituting at least a portion of the subset of the set of spatial position data corresponding to the priority region for at least a portion of the subset of the patch of terrain data.

3. The system of claim 1, wherein:
   the position data source comprises a navigational database; and
   the set of spatial position data comprises spatial position information derived from a plurality of data points stored in the navigational database.

4. The system of claim 1, wherein:
   the position data source comprises a ground-based data-link; and
   the set of spatial position data comprises spatial position information derived from the ground-based data-link, the spatial position information characterizing at least one three-dimensional spatial location for at least one data point of interest.

5. The system of claim 1, wherein the position data source comprises at least one onboard real-time sensor, the set of spatial position data comprising spatial position information derived from the at least one onboard real-time sensor.

6. The system of claim 1, wherein the set of spatial position data further comprises at least one spatial position of interest, the at least one spatial position of interest including data representing at least one of a navigation waypoint and a runway.

7. The system of claim 1, wherein the processing unit is operable to augment the subset of the patch of terrain data by performing a data correction operation, the data correction operation comprising an operation to compare a plurality of runway end data points for the priority region from a navigational database with the set of terrain data, and correct the set of terrain data with the plurality of runway end data points.

8. The system of claim 1, wherein the processing unit is further operable to:
    generate a first plurality of control signals for the visual display, the first plurality of control signals representing the augmented patch of terrain data for the visual display.

9. The system of claim 1, wherein the set of spatial position data is associated with the at least one of the current position, heading and speed and an attitude of an aircraft.

10. The system of claim 1, wherein the set of spatial position data is selected from a group consisting of high precision data, high accuracy data, high priority data, and real-time data.

11. The system of claim 1, wherein the visual display is selected from a group consisting of a Primary Flight Display, a Heads-Down Display, and a Heads-Up Display.

12. The system of claim 1, wherein the processing unit is further operable to:
    limit the patch of terrain data so as to minimize a processing duration for verifying an integrity value associated with the patch of terrain data;
    verify the integrity value for the limited patch of terrain data; and
    load the limited patch of terrain data.

13. The system of claim 1, wherein the processing unit is further operable to:
    generate an alert message for display, if the augmented patch of terrain data is substantially different than the patch of terrain data.

14. The system of claim 1, wherein the set of spatial position data comprises a set of independent spatial position data including at least one of a subset of the set of terrain data or all of the set of terrain data.

15. The system of claim 1, wherein the set of terrain data comprises high resolution terrain data.

16. The system of claim 1, wherein the set of spatial position data comprises real-time position data including at least one of a subset of the set of terrain data and all of the set of terrain data.

17. A system for an aircraft, the system comprising:
    a visual display;
    a database to store terrain data for a priority region;
    a vision sensor system to obtain spatial position data for the priority region; and
    a processing unit to:
        identify the priority region based on current flight status information for the aircraft;
        determine the spatial position data for the priority region is more accurate than the terrain data for the priority region;
        augment the terrain data for the priority region with the spatial position data in response to determining the spatial position data is more accurate; and
        provide the augmented terrain data for the priority region to the visual display.

18. The system of claim 17, wherein:
    the vision sensor system includes one or more sensors onboard the aircraft; and
    the spatial position data comprises real-time terrain information derived from the one or more sensors.

19. A system for an aircraft, the system comprising:
    a visual display;
    a database to store terrain data for a priority region;
    a position data source to obtain spatial position data for the priority region; and
    a processing unit to:
        identify the priority region based on current flight status information for the aircraft;
        determine the spatial position data for the priority region is more accurate than the terrain data for the priority region;
        augment the terrain data for the priority region with the spatial position data in response to determining the spatial position data is more accurate; and
        provide the augmented terrain data for the priority region to the visual display.

* * * * *